United States Patent [19]

Gualtieri

[11] Patent Number: 5,245,689
[45] Date of Patent: Sep. 14, 1993

[54] MAGNETO-OPTICAL WAVEGUIDES OF ALUMINUM GARNET

[75] Inventor: Devlin M. Gualtieri, Ledgewood, N.J.

[73] Assignee: Allied-Signal Inc., Morristownship, Morris County, N.J.

[21] Appl. No.: 844,065

[22] Filed: Mar. 2, 1992

Related U.S. Application Data

[63] Continuation-in-part of Ser. No. 706,492, May 28, 1991, Pat. No. 5,113,472.

[51] Int. Cl.$^5$ .............................................. G02B 1/37
[52] U.S. Cl. ................................................. 385/142
[58] Field of Search ....................................... 385/142

[56] References Cited

U.S. PATENT DOCUMENTS 5,113,472  5/1992  Gualtieri et al. ................... 385/130

OTHER PUBLICATIONS

"Ion-Implanted Nd:YAG Planar Waveguide Laser" By Chandler et al. Electron. Lett., 25 No. 15, pp. 985-986 Jul. 1989.

"Magneto-optical garnet films with high Faraday rotation & Controlled coercivity", By Guattieri et al., J. Appl. Phys., 57(1) pp. 3879-3881, 4, 1985.

Zook et al., "Fiber Optic tachometer based on the Faraday effect" Appl. Optics, 28 No. 11, pp. 1991-1994, Jun. 1989.

"Yttrium iron garnet Single-mode burried Channel Waveguides for Waveguide isolators" by Pross et al., Appl. Phys. Lett. 52(9) pp. 682-684, Feb. 1988.

"Etch-tuned ridged waveguide magneto-optic isolator" By Wolfe et al. Appl. Phys. Lett. 56(5) pp. 426-428, Jan. 1990.

"Broadband magneto-optic waveguide isolator" By Wolfe et al. Appl. Phys. Lett. 57 (10) pp. 960-962 Sep. 1990.

"Magnetic and magneto-optic properties of lead and bismuth substituted yttrium iron garnet films" By Hansen et al. Phys Rev. B27 pp. 6608-6625 (1983).

"Growth of High-Quality Garnet Thin Films from supercooled Melts", By Levinstein et al., Appl. Phys. Lett. 19(11), pp. 486-488, Dec. 1971.

"Dispersion-our current understanding" By Nassau, Phys Today Sep. (1984).

"Precision Lattice Constant Determination" By Bond Acta Cryst. 13 pp. 814-818 (1960).

"Precision Lattice Constant Determination" By Bond Acta Cryst. A31, p. 698 (1975).

"A survey of precision lattice parameter measurements as a tool for the characterization of single crystal materials" By Barns, Mat. Res. Bull, 2, pp. 273-282 (1967).

"Faraday Rotator Materials" By Weber, Report M-103, Lawrence Livermore National Lab Univ. of California, Livermore Calif. 94550, Jun. (1982).

"Elimination of birefringence in garnet films for magneto-optic waveguide devices" By Wolfe et al., Appl. Phys. Lett. 51(6), pp. 1221-1223 Oct. 1987.

"Magneto optical Properties of the Ca:(yttrium iron garnet) epitaxial layer substrate interface on gadolinium gallium garnet" by Gualtieri, J. Appl. Phys. 67(9) pp. 4793-4795 (May 1990).

"Compact Optical Isolator" By Sansalone Appl. Optics, 10(10), pp. 2329-2331 Oct. (1971).

"Bismuth rare-earth iron garnet composition for a magneto-optical wheel rotation rate sensor" By Gualtieri et al., J. Appl. Phys. 69(8) pp. 5978-5980 (Apr. 1991).

Primary Examiner—Akm E. Ullah
Attorney, Agent, or Firm—Gerhard H. Fuchs; Richard G. Stewart

[57] ABSTRACT

Magneto-optically active waveguides suitable for use in high temperature environments are constructed of a magneto-optically active waveguiding body composed of a first crystalline aluminum garnet, which is clad with an epitaxially deposited layer of a second crystalline aluminum garnet. The second crystalline aluminum garnet has a lower refractive index than the first crystalline aluminum garnet.

15 Claims, 4 Drawing Sheets

MAGNETO-OPTICAL WAVEGUIDES OF ALUMINUM GARNET

CROSS-REFERENCE TO RELATED APPLICATION

This application is a continuation-in-part of commonly assigned copending U.S. application Ser. No. 706,492 filed May 28, 1991, now U.S. Pat. No. 5,113,472.

BACKGROUND OF THE INVENTION

1. Field of the Invention

This invention provides clad magneto-optical waveguides of aluminum garnet suitable for use at high temperatures and at visible, blue, infra-red and ultra-violet wavelengths. These structures comprise a waveguiding body of magneto-optically active crystalline aluminum garnet of a high refractive index, clad with crystalline aluminum garnet of a lower refractive index. They can be in the form of fibers, slabs, channels, ribs, or any of the typical optical waveguide structures. Their applications include optical isolating and magnetic field sensing elements.

2. Description of the Prior Art

High temperature waveguides are commonly made of sapphire, a crystal form of the high melting oxide $Al_2O_3$ (melting point 2054° C.). Optical waveguides of sapphire have significant optical loss due to the lack of a suitable cladding material. A metal overcoat is used to protect such waveguides from the environment, but the transmission efficiency of this structure is low. A low loss optical waveguide requires a higher refractive index core surrounded by a lower refractive index cladding, and this is not provided in the metal-clad sapphire core waveguides.

P. J. Chandler et al. [Electron. Lett. 25, 985 (1989)] have used an ion-implantation technique to produce a slab waveguide in the aluminum garnet $(Y,Nd)_3Al_5O_{12}$. This ion-implantation technique, unlike the technique of the present invention, makes use of the displacement of atoms in the crystal from their usual positions in the crystal lattice to generate regions of a small refractive index change. This ion-implantation technique is not suitable for use in high temperature waveguides, since the crystal structure will relax to its equilibrium state after exposure to high temperature.

Iron garnets are important magneto-optical materials because of their high Faraday rotation. Yttrium iron garnet (YIG), for example, has a Faraday rotation of about 0.1 deg/$\mu$m at visible wavelengths. Bismuth-substituted iron garnet also has large Faraday rotation [D. M. Gualtieri et al., J. Appl. Phys. 57, 3879 (1985)]. A magneto-optical sensor using a yttrium iron garnet (YIG) single crystal at 1300 nm has been described by Zook et al. [Appl. Optics 28, 1991 (1989)]. Their device consists of a YIG rod, 5 mm diameter by 6.3 mm length, mirrored at one end, which is coupled through a polarizer and a gradient index (GRIN) rod to an input and output fiber. Waveguide optical isolators of iron garnet have been described by E. Pross et al.[Appl. Phys. Lett. 52, 682 (1988)]; R. Wolfe et al. [Appl. Phys Lett. 56, 426 (1990)]; and R. Wolfe et al. [Appl. Phys. Lett 57, 960 (1990).

The principal disadvantage in the use of iron garnet in magneto-optical waveguides is the limited temperature range of performance. Iron garnets are ferrimagnets which maintain their ideal magnetic properties only up to a definite temperature limit, i.e. the Curie temperature. A representative iron garnet, YIG, has a Curie temperature of 556K (283° C.). Bismuth substitution for yttrium increases the Curie temperature by 38K for every formula unit atom [P. Hansen et al., Phys. Rev. B27, 6608 (1983)], allowing operation of waveguide isolators and sensors of this material to a maximum temperature of about 300° C. There are many applications which require operation above this temperature Another major problem with the use of iron garnet, and to a somewhat greater extent of bismuth iron garnets, in magneto-optical waveguides is their high optical absorption at visible and shorter wavelengths. The figure of merit of these materials, which is defined as the ratio of the optical rotation to the optical absorption, decreases at short wavelengths. Bismuth substituted garnets are generally useful as optical isolators only at long wavelengths, such as 1300 and 1500 nm, where the figure of merit is of the order of hundreds of deg/dB.

SUMMARY OF THE INVENTION

This invention provides magneto-optically active optical waveguide structures suitable for high temperature applications. They are comprised of magneto-optically active crystalline aluminum garnet of a high refractive index, clad with an epitaxial layer of an aluminum garnet having a lower refractive index.

The magneto-optically active aluminum garnets for the higher refractive index body of the waveguide as well as for the lower refractive index cladding layer are suitably selected from aluminum garnets of the composition

$$R_3(Al,T)_5O_{12}$$

wherein

R represents one or more of the elements selected from the group consisting of calcium, magnesium, sodium, strontium, yttrium, lanthanum, praseodymium, neodymium, samarium, europium, gadolinium, terbium, dysprosium, holmium, erbium, thulium, ytterbium and lutetium; and T represents one or more of the 3-valent elements selected from the group consisting of gallium, indium, and scandium;

with the provisos that (1) the molar ratio of the combined concentration of indium plus scandium to aluminum does not exceed 2:3;

(2) if R includes one or more of $Na^{+1}$, $Ca^{+2}$, $Mg^{+2}$; or $Sr^{+2}$, then T must include one or more charge-compensating ions selected from the group consisting of $Fe^{+4}$, $Ge^{+4}$, $Hf^{+4}$, $Ir^{+4}$, $Mo^{+4}$, $Nb^{+4}$, $Os^{+4}$, $Pb^{+4}$, $Pt^{+4}$, $Re^{+4}$, $Rh^{+4}$, $Ru^{+4}$, $Si^{+4}$, $Sn^{+4}$, $Ta^{+4}$, $Ti^{+4}$, $Zr^{+4}$, $V^{+4}$, $W^{+4}$, $As^{+5}$, $Mo^{+5}$, $Nb^{+5}$, $Re^{+5}$, $Sb^{+5}$, $Ta^{+5}$, $U^{+5}$, $V^{+5}$, $Mo^{+6}$, $Re^{+6}$, $W^{+6}$, and $Re^{+7}$, in proportions sufficient to achieve an average cation charge of three in the crystal; and (3) in the waveguiding body, R must include at least one or more of praseodymium, neodymium, samarium, gadolinium, terbium, dysprosium, holmium, erbium, thulium and ytterbium.

More desirably, R represents one or more of the elements selected from the group consisting of calcium, magnesium, yttrium, lanthanum, praseodymium, neodymium, samarium, europium, gadolinium, terbium, dysprosium, holmium, erbium, thulium, ytterbium and lutetium, and if R is one or both of $Ca^{+2}$ and $Mg^{+2}$, then T should include one or both of $Ge^{+4}$ and $Si^{+4}$ in equimolar concentration relative to the $Ca^{+2}$ and/or $Mg^{+2}$ to achieve an average cation charge of three in the crystal.

An especially suitable aluminum garnet for the cladding layer is yttrium aluminum garnet, $Y_3Al_5O_{12}$ or "YAG"

The R and T elements in the aluminum garnet for the waveguide body and for the cladding layer, and their proportions, are selected to give as large as possible a refractive index difference while still maintaining lattice constant matching. For example, if YAG is chosen for the epitaxial cladding layer, then the aluminum garnet compositions of the types $(Tb,Lu)_3Al_5O_{12}$ and $Ho_3Al_5O_{12}$ have teen found to meet the criteria of large difference in refractive indexes and lattice matching particularly well; they also have sufficient magneto-optical activity.

BRIEF DESCRIPTION OF THE DRAWINGS

In the annexed drawings.

Figure 1:
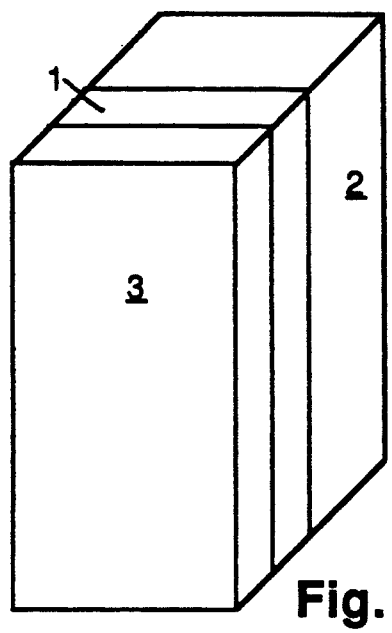
FIG. 1 illustrates a layer (1) of a magneto-optically active aluminum garnet of high refractive index and lattice constant match to YAG epitaxially deposited on a YAG substrate (2) and then epitaxially overcoated with an epitaxial YAG layer (3) to form a "sandwich" structure in which the high refractive index waveguiding layer is clad with the lower refractive index cladding layer in a "slab" waveguide geometry.

DETAILED DESCRIPTION OF THE INVENTION, OF THE PREFERRED EMBODIMENTS, AND OF THE BEST MODE PRESENTLY CONTEMPLATED FOR ITS PRACTICE

Garnets are oxides of the general composition $R_3T_5O_{12}$, wherein R and T respectively represent elements which form large and small ions of positive charge (cations). Garnets are resistant to chemical attack and high temperatures. There is much diversity in garnet composition, since R and T can be combinations of one or several elements cohabiting a crystal sublattice, and R and T range over much of the Periodic Table.

Aluminum garnets, $R_3Al_5O_{12}$, are mechanically strong and highly resistant to chemical attack. They are high temperature materials. As mentioned above, yttrium aluminum garnet (YAG) has a melting point of 1947° C. Other properties of YAG, which is a representative aluminum garnet, are a density of 4.55 g/cc, a hardness of 8.5 moh, a thermal conductivity at 300K of 0.13 W/cm/K, and a refractive index of 1.84 at 550 nm.

The aluminum garnets are optically transparent to long wavelengths. The melting point of the aluminum garnets is nearly the same as that of sapphire. One advantage that the aluminum garnets have over sapphire in high temperature waveguide applications is that the infrared absorption edge of the former extends to longer wavelengths, allowing efficient use of these waveguides at longer wavelengths of light. Another advantage of the aluminum garnets is the mature state of the art of their epitaxial growth. The epitaxial crystal growth process allows deposition of garnet layers on garnet substrates. Waveguiding and cladding layers can be deposited by the epitaxial crystal growth process, allowing fabrication of clad aluminum garnet optical waveguides.

The common technique for the epitaxial crystal growth of garnet is the liquid phase epitaxy technique, more specifically the horizontal dipping technique with rotation, as developed by H. J. Levinstein et al., (Appl. Phys. Lett. 19, 486 (1971)). This liquid phase epitaxy technique was developed to a high state of the art in research on magnetic bubble memory materials. Magnetic bubble memory devices utilize epitaxial layers of rare earth iron garnet on gadolinium gallium garnet (GGG) substrates. Such layers must be nearly defect-free for proper device operation.

The growth of an epitaxial garnet layer by liquid phase epitaxy proceeds as follows. A garnet substrate is carefully cleaned and mounted in a substrate holder which allows horizontal rotation and vertical translation. The substrate is then "dipped" by vertical translation into a tube furnace containing a platinum crucible holding the molten constituent oxides of the garnet which is to be epitaxially deposited. These oxides are dissolved in a suitable melt solvent, usually a lead oxide based solvent first heated to 1000° C. and then supercooled to about 20° C. below the temperature at which garnet crystals will grow (the saturation temperature).

The substrate submerged in the growth solution is rotated at about 100-250 rev/min, and a garnet layer is epitaxially grown on the substrate at a rate of about 0.5-1.0 μm/min. After time sufficient for growth of the desired layer thickness, the substrate is pulled vertically from the growth solution, and the clinging solution is "spun-off" at high speed. The substrate, now with an epitaxial layer, is removed from the furnace, and remaining traces of solidified growth solution are removed by treatment with a suitable solvent, usually hot nitric acid.

Fabrication of magneto-optical waveguides in accordance with the present invention involves cladding a magneto-optically active aluminum garnet substrate of waveguiding structure with an epitaxial aluminum garnet layer having a lower refractive index than the substrate. The body of the magneto-optically active waveguide within which the light is transmitted is always formed of a single crystal. Optical waveguiding structures of aluminum garnet can be fabricated in a variety of forms, such as fibers, slabs, channels, or ribs. For example, with reference to FIG. 1, an epitaxial layer 1 of a magneto-optically active aluminum garnet of high refractive index and lattice constant match to YAG can be epitaxially deposited on a YAG substrate 2 and then epitaxially overcoated with a further epitaxial YAG layer 3 to form a "sandwich" structure in which the high refractive index magneto-optically active waveguiding layer 1 is clad with the lower refractive index cladding layers 2 and 3 in a "slab" waveguide geometry. Similarly, as illustrated in FIG. 2, a fiber 4 of a single crystal higher refractive index magneto-optically active aluminum garnet can be epitaxially coated with a layer 5 of a lower refractive index aluminum garnet composition, such as YAG, to form a magneto-optically active waveguiding fiber.

Figure 2:
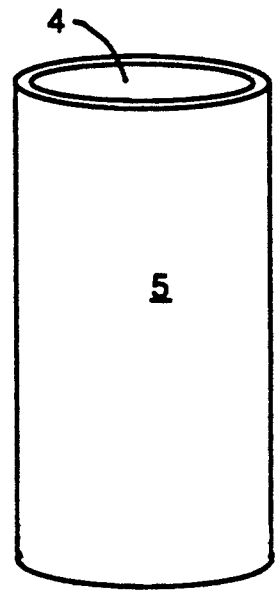
FIG. 2 illustrates a magneto-optically active aluminum garnet fiber (4) epitaxially coated with a YAG layer (5) to form a waveguiding fiber.
Figure 3:
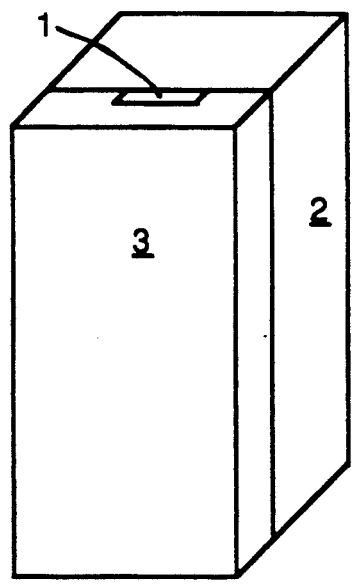
FIG. 3 illustrates a rib waveguide produced by an epitaxial process as the slab guide of FIG. 1, except that the waveguiding layer is patterned into a "rib" before cladding (reference numerals as in FIG. 1)

A rib waveguide as illustrated by FIG. 3 can be produced by the same epitaxial process as for a slab, as illustrated by FIG. 1, except that the higher refractive index magneto-optically active waveguiding layer 1 (which has been epitaxially deposited on lower refractive index substrate 2) is patterned into a "rib" before it is epitaxially clad with lower refractive index layer 3. Such "rib" waveguides have been produced in iron garnets by Pross et al. [E.Pross et al., Appl. Phys. Lett. 52, 682 (1988)]. Similar waveguides in iron garnet have been reported by R. Wolfe et al. [R. Wolfe et al., J. Appl. Phys. 56, 426 (1990); J. Appl. Phys. 57, 960 (1990)]. The difference in refractive index between waveguiding and cladding layers in the reported iron garnet waveguides is about 0.3%.

Figure 4:
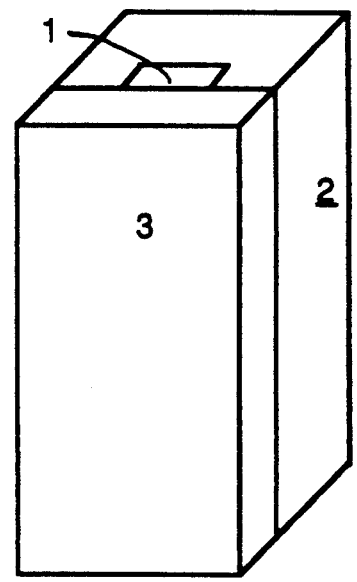
FIG. 4 illustrates a channel waveguide formed as a variation of a rib waveguide in which the magneto-optically active guiding material is deposited in a channel in the substrate layer before cladding (reference numerals as in FIG. 1)

A channel waveguide as illustrated by FIG. 4 is a variation of a rib waveguide in which the magneto-optically active guiding aluminum garnet crystal 1 is deposited in a channel in the substrate 2, and then clad with a further layer 3.

Magneto-optically active waveguides of aluminum garnet, as provided by this invention, are most conveniently prepared by the liquid phase epitaxy crystal growth technique. The growth of an aluminum garnet crystal layer by liquid phase epitaxy on an aluminum garnet substrate, for example, a wafer of YAG, proceeds as follows: A substrate crystal of YAG, or YAG with a previous overgrowth of a garnet crystal, is carefully cleaned and mounted in a substrate holder which allows horizontal rotation and vertical translation. The substrate is then "dipped" by vertical translation into a tube furnace containing a platinum crucible holding the molten constituent oxides of the aluminum garnet which is to be grown dissolved in a lead oxide based solvent, or other suitable solvent as is known in common crystal growth practice. In the case of a lead oxide based solvent, this mixture (termed a "melt") is first heated to about 1150° C. for a period of about eight hours, to homogenize the components, and then supercooled to about 20° C. below the temperature at which garnet crystals will grow (the saturation temperature)

After the substrate is dipped into the growth solution, it is rotated at about 100–250 rev/min, and an aluminum garnet layer is epitaxially grown on the substrate at a rate of about 0.5–2.5 μm/min. After time sufficient for growth of the desired layer thickness, the substrate is pulled vertically from the growth solution, and the clinging solution is "spun-off" by rotation at high speed. The substrate, now with an epitaxial layer, is removed from the furnace, and remaining traces of solidified growth solution are removed in hot nitric acid. As this epitaxial crystal growth technique is in common and widespread use, the distinguishing features of this invention are the compositions of the epitaxial crystals and the compositions of the melts from which they are grown.

Purity of starting materials is important, since many impurity components will cause optical absorption in the waveguides and reduce the transmission efficiency. For example, holmium, a rare-earth impurity, absorbs strongly at the wavelength of a red helium-neon gas laser, 632.8 nm. The rare earths are chemically similar and difficult to separate, so that such impurity absorption is a common problem. In general, the purity of the rare earth components of a melt should be at least 99.9%, and the purity of the lead oxide solvent should be at least 99.999%.

The difference in refractive index between the higher refractive index magneto-optically active aluminum garnet single crystal waveguiding body and the lower refractive index epitaxial aluminum garnet cladding should be at least least about 0.02%, preferably at least about 0.1%, more preferably at least about 0.5%. There is no upper limit on the difference in refractive indices. Any combination having sufficiently different refractive indices is suitable for present purposes, so long as the lattice constants of these garnets are sufficiently close to permit epitaxial deposition of one on the other. To permit such epitaxial deposition, the lattice mismatch should not be larger than about 1.4%, desirably not larger than about 0.15%. Preferably, it is less than about 0.05%.

The refractive index of aluminum garnet can be predicted to serve as a guide to composition selection for use in the waveguides of the present invention, as described by K. Nassau, Physics Today, September 1984, p. 42 in an article entitled Dispersion—our current understanding. Briefly, the refractive index of aluminum garnets is a function of wavelength, and the ultraviolet and infrared absorption bands of the crystal. Knowledge of the absorption parameters (which can be readily determined using conventional procedures) allows calculation of the refractive index for a particular composition at any wavelength by the "Sellmeier" equation. For example, a linear combination of the refractive indices of the terminal aluminum garnet compositions $(R^1)_3(Al,T^1)_5O_{12}$ and $(R^2)_3(Al,T^2)_5O_{12}$ is sufficient to give the refractive index of any intermediate aluminum garnet composition $(R^1, R^2)_3(Al,T^1,T^2)_5O_{12}$.

The lattice constants of the aluminum garnets useful for making the present waveguides are determined using conventional X-ray diffraction procedures, as for example described in W. L. Bond, Precision Lattice Constant Determination, Acta Cryst. 13, 814–818 (1960); W. L. Bond, Precision Lattice Constant Determination: Erratum, Acta Cryst A31, 698 (1975); and R. L. Barnes, A Survey of Precision Lattice Parameter Measurements as a Tool for the Characterization of Single-Crystal Materials, Mat. Res. Bull. 2, 273-282 (1967). The magneto-optical waveguides of aluminum garnet of the present invention are distinguished by the presence of rare-earth cations of significant magnetic moment. As described by M. J. Weber in a report entitled "Faraday Rotator Materials" [Report M-103, Lawrence Livermore National Laboratory, University of California, Livermore, Calif. 94550, June 1982], the Verdet constant of a paramagnetic Faraday rotator such as the aluminum garnets is principally dependent on the constant $$gJ(J+1)$$

in which g is the electron gyrotropic ratio and J is the angular momentum quantum number of the rare-earth cation. Table I lists this constant for the rare-earth cations which substitute into the aluminum garnet crystal.

TABLE I

Calculated Constants gJ (J + 1) for Rare-Earth Cations

| Ion | gJ (J + 1) |
|---|---|
| $Y^{3+}$ | 0.0 |
| $Ce^{3+}$ | 7.5 |
| $Pr^{3+}$ | 16.0 |
| $Nd^{3+}$ | 18.0 |
| $Pm^{3+}$ | 12.0 |
| $Sm^{3+}$ | 2.5 |
| $Eu^{3+}$ | 0 |
| $Gd^{3+}$ | 31.5 |
| $Tb^{3+}$ | 63.0 |
| $Dy^{3+}$ | 85.0 |
| $Ho^{3+}$ | 90.0 |
| $Er^{3+}$ | 76.5 |
| $Tm^{3+}$ | 49.0 |
| $Yb^{3+}$ | 18.0 |
| $Lu^{3+}$ | 0.0 |

Aluminum garnet waveguiding compositions which incorporate any of the cations with non-zero values of gJ(J+1) will exhibit a substantial magneto-optical effect. Compositions incorporating a larger proportion of cations with large gJ(J+1), such as $Ho^{3+}$, will exhibit a greater effect. Other factors, such as optical transmission of the aluminum garnet waveguide may limit selection of composition. Thus $Tb^{3+}$ may be preferred to $Ho^{3+}$ in compositions, since $Ho^{3+}$ in aluminum garnet induces optical absorption bands in the visible spectrum. Furthermore, lattice constant control of the epitaxial waveguide on the substrate wafer is essential to eliminate stress-induced birefringence which will hinder the magneto-optical effect. Birefringence effects and their control in magneto-optical waveguides of iron garnet are described in detail by R. Wolfe et al., Appl. Phys. Lett 51, 1221 (1987).

Table II, below, summarizes preferred compositions for magneto-optical waveguides of aluminum garnet when YAG is used as the substrate crystal, along with the value of gJ(J+1). The utility of these waveguides in magneto-optical applications will scale with the gJ(J+1) values. In particular, the composition $Tb_{1.63}Lu_{1.37}Al_5O_{12}$ is most preferred. The compositions $Tb_{1.63}Lu_{1.37}Al_5O_{12}$, $Ho_3Al_5O_{12}$, $Dy_{1.00}Er_{2.00}Al_5O_{12}$, $Dy_{0.18}Er_{2.82}Sc_{0.12}Al_{4.88}O_{12}$, and $Tb_{0.16}Er_{2.84}Sc_{0.10}Al_{4.90}O_{12}$ are preferred. The remaining compositions are adequate.

TABLE II

Magneto-Optical Waveguides of Aluminum Garnet for YAG Substrate Crystal

| Waveguide Composition | gJ (J + 1) c-site sum | gJ (J + 1) per atom |
|---|---|---|
| $Ho_3Al_5O_{12}$ | 270.0 | 90.0 |
| $Tb_{1.63}Lu_{1.37}Al_5O_{12}$ | 102.7 | 34.2 |
| $Tb_{1.47}Yb_{1.53}Al_5O_{12}$ | 120.2 | 40.0 |
| $Tb_{1.10}Tm_{1.90}Al_5O_{12}$ | 162.4 | 54.1 |
| $Tb_{0.61}Er_{2.39}Al_5O_{12}$ | 221.3 | 73.8 |
| $Dy_{2.09}Lu_{0.91}Al_5O_{12}$ | 177.7 | 59.2 |
| $Dy_{1.95}Yb_{1.05}Al_5O_{12}$ | 184.7 | 61.5 |
| $Dy_{1.59}Tm_{1.41}Al_5O_{12}$ | 204.2 | 68.1 |
| $Dy_{1.00}Er_{2.00}Al_5O_{12}$ | 238.0 | 79.3 |
| $Gd_{1.33}Lu_{1.67}Al_5O_{12}$ | 41.9 | 14.0 |
| $Gd_{1.17}Yb_{1.83}Al_5O_{12}$ | 69.8 | 23.3 |
| $Gd_{0.84}Tm_{2.16}Al_5O_{12}$ | 132.3 | 44.1 |
| $Gd_{0.44}Er_{2.56}Al_5O_{12}$ | 209.7 | 69.9 |
| $Y_{0.66}Yb_{2.34}Sc_{0.44}Al_{4.56}O_{12}$ | 42.1 | 14.0 |
| $Y_{0.44}Tm_{2.56}Sc_{0.29}Al_{4.71}O_{12}$ | 125.4 | 41.8 |
| $Y_{0.21}Er_{2.79}Sc_{0.14}Al_{4.86}O_{12}$ | 213.4 | 71.1 |
| $Dy_{0.67}Lu_{2.33}Sc_{0.45}Al_{4.55}O_{12}$ | 57.0 | 19.0 |
| $Dy_{0.56}Yb_{2.44}Sc_{0.38}Al_{4.62}O_{12}$ | 91.5 | 30.5 |
| $Dy_{0.37}Tm_{2.63}Sc_{0.25}Al_{4.75}O_{12}$ | 160.3 | 53.4 |
| $Dy_{0.18}Er_{2.82}Sc_{0.12}Al_{4.88}O_{12}$ | 231.0 | 77.0 |
| $Tb_{0.61}Lu_{2.39}Sc_{0.41}Al_{4.59}O_{12}$ | 38.4 | 12.8 |
| $Tb_{0.51}Yb_{2.49}Sc_{0.34}Al_{4.66}O_{12}$ | 77.0 | 25.6 |
| $Tb_{0.33}Tm_{2.67}Sc_{0.22}Al_{4.78}O_{12}$ | 151.6 | 50.5 |
| $Tb_{0.16}Er_{2.84}Sc_{0.10}Al_{4.90}O_{12}$ | 227.3 | 75.8 |
| $Gd_{0.55}Lu_{2.45}Sc_{0.36}Al_{4.64}O_{12}$ | 17.3 | 5.8 |
| $Gd_{0.46}Yb_{2.54}Sc_{0.30}Al_{4.70}O_{12}$ | 60.2 | 20.1 |
| $Gd_{0.29}Tm_{2.71}Sc_{0.20}Al_{4.80}O_{12}$ | 141.9 | 47.3 |
| $Gd_{0.14}Er_{2.86}Sc_{0.09}Al_{4.91}O_{12}$ | 223.2 | 74.4 |
| $Ca_{1.00}Tb_{2.00}Si_{1.00}Al_{4.00}O_{12}$ | 126.0 | 42.0 |
| $Ca_{0.61}Dy_{2.39}Si_{0.61}Al_{4.39}O_{12}$ | 203.2 | 67.7 |
| $Ca_{1.28}Gd_{1.72}Si_{1.28}Al_{3.72}O_{12}$ | 54.2 | 18.1 |
| $Ca_{2.02}Dy_{0.98}Si_{2.02}Sc_{0.66}Al_{2.32}O_{12}$ | 83.3 | 27.8 |
| $Ca_{2.10}Tb_{0.90}Si_{2.10}Sc_{0.60}Al_{2.30}O_{12}$ | 56.7 | 18.9 |
| $Ca_{2.18}Gd_{0.82}Si_{2.18}Sc_{0.55}Al_{2.27}O_{12}$ | 25.8 | 8.6 |
| $Ca_{1.12}Yb_{1.88}Ge_{1.12}Al_{3.88}O_{12}$ | 33.8 | 11.3 |
| $Ca_{0.79}Tm_{2.21}Ge_{0.79}Al_{4.21}O_{12}$ | 108.3 | 36.1 |
| $Ca_{0.41}Er_{2.59}Ge_{0.41}Al_{4.59}O_{12}$ | 198.1 | 66.0 |

The required thickness of the magneto-optical guiding layer (the layer in which the light is being propagated) is a function of the relative refractive indices of the guiding layer, the cladding layers, the wavelength of the light to be guided, and the number of modes which are to be transmitted. Procedures for calculating the thickness of the guiding layer based on these parameters are well known to those skilled in the art of optical waveguiding.

As to the thickness of the cladding layer, it can be zero, since waveguiding will still occur under conditions in which the waveguiding layer is exposed to air (refractive index 1), but the thickness of the cladding layer for usual operation is desirably large. Of course, there is no limits to the thickness, other than those dictated by practical considerations of relating to construction, expense of application, etc. In practice the thickness of the cladding layer should be large with respect to the ratio of the wavelength to the refractive index difference between waveguide and cladding layer. It can be made thinner if greater optical loss is tolerable under usual operating conditions at which the waveguide will be exposed to an environment of arbitrary refractive index. In general, the ratio of the thickness of the cladding layer to the ratio of the wavelength to the refractive index difference between waveguide and cladding layer should preferably be greater than 0.01, more preferably greater than 0.1. In practical operation, the thickness of the cladding layer will ordinarily be at least about 3 μm, more desirably at least about 10 μm; preferably at least about 25 μm, and more preferably yet at least about 100 μm.

EXAMPLE 1

Epitaxial layers of the aluminum garnet magneto-optical waveguiding composition $Tb_{1.63}Lu_{1.37}Al_5O_{12}$ were prepared on both sides of a wafer substrate of $Y_3Al_5O_{12}$ (YAG) crystal using the melt composition as set forth, below.

| Oxide | Mole Fraction | Moles | Grams per Mole | Grams |
|---|---|---|---|---|
| PbO | 0.89241 | 3.40564 | 223.189 | 760.104 |
| Al2O3 | 0.02631 | 0.10039 | 101.960 | 10.236 |

-continued

| Oxide | Mole Fraction | Moles | Grams per Mole | Grams |
|---|---|---|---|---|
| B2O3 | 0.07437 | 0.28380 | 69.620 | 19.758 |
| Tb2O3 | 0.00498 | 0.01902 | 365.848 | 6.959 |
| Lu2O3 | 0.00194 | 0.00740 | 397.938 | 2.943 |
|  | 1.00000 | 4.77365 |  | 800.000 |

This melt can also be described by the following composition parameters:

$Al_2O_3/(Tb_2O_3+Lu_2O_3)=3.8$ $PbO/2B_2O_3=6$ $(Al_2O_3+Tb_2O_3+Lu_2O_3)/(Al_2O_3+Tb_2O_3+Lu_2O_3+B_2O_3+1/2PbO)=0.06$ $Tb_2O_3/(Tb_2O_3+Lu_2O_3)=0.72$ $Lu_2O_3/(Tb_2O_3+Lu_2O_3)=0.28$

The aluminum garnet composition $Tb_{1.63}Lu_{1.37}Al_5O_{12}$ was selected since $Tb^{3+}$ has a large $gJ(J+1)$ value and was expected to demonstrate a large magneto-optical effect. Significant absorption bands in the visible spectrum do not appear in this composition, and the composition is well matched in lattice constant to the YAG substrate.

The epitaxial layer was prepared at 1058.5° C. The YAG wafer substrate was axially rotated in the melt at a unidirectional rate of 200 rev/min, and epitaxially growth proceeded over the course of five minutes at a growth rate of 1.4 µm/min. This resulted in the growth of epitaxial layers of 7 µm thickness on each side of the YAG wafer.

Figure 5:
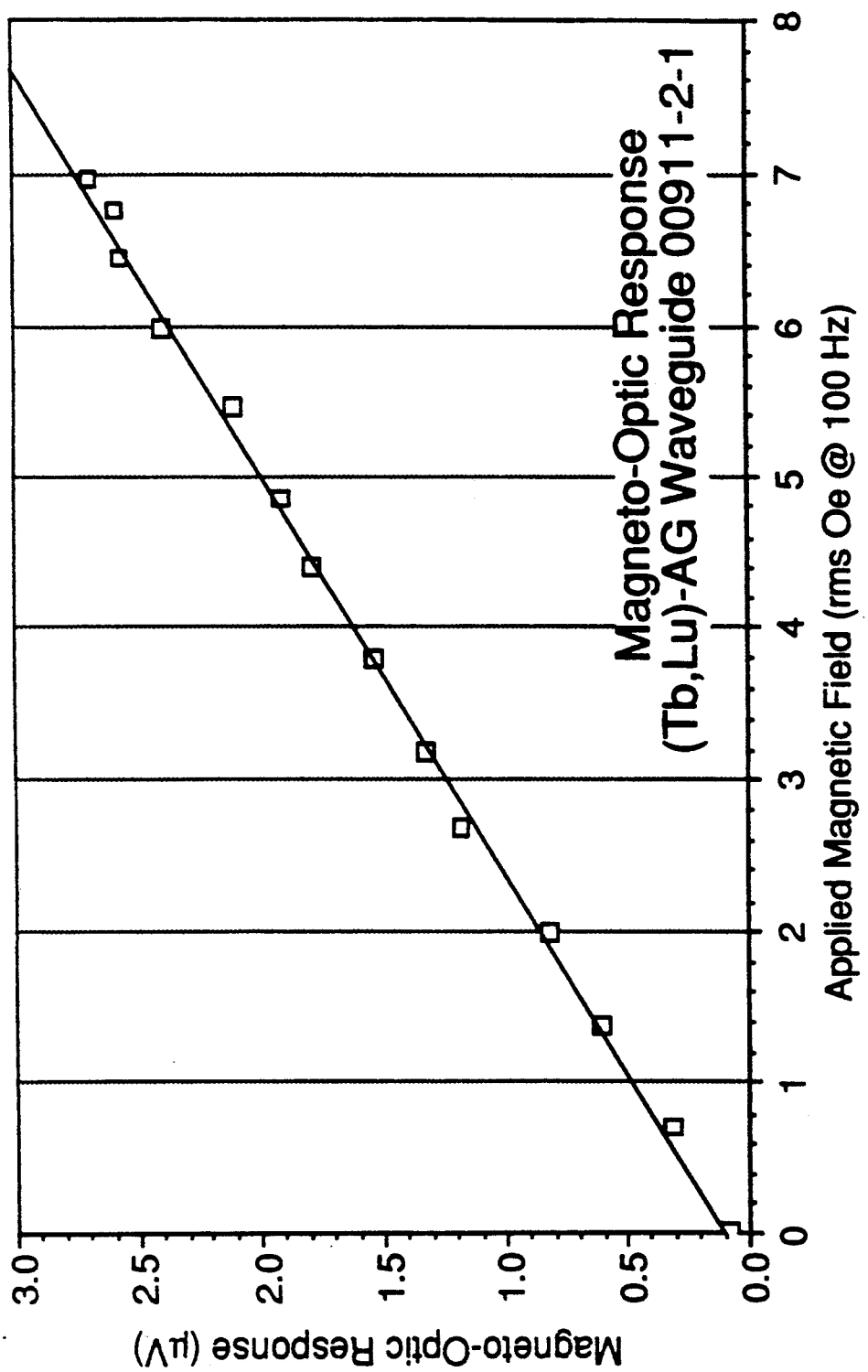
FIG. 5 is a graph showing the measured magneto-optical response of the aluminum garnet waveguide of Example 1.

The magneto-optical effect in this waveguide was demonstrated by prism-coupling a polarized light beam into one mode of the waveguide, and detecting the intensity of the waveguided light through a polarizing filter at the far edge of the wafer, at a path length of about 1 cm. A magnetic field was applied coaxial with the waveguiding track by a solenoid coil. To enhance the signal-to-noise level of the magneto-optical response, the magnetic field was modulated, and the optical signal was synchronously detected by a lock-in amplifier. In this experiment, the waveguide was examined in its "as-grown" state, and the wafer edges were not specially prepared for output coupling. FIG. 5 shows lock-in amplifier output voltage plotted as a function of magnetic field strength for 100 Hz modulation, demonstrating the magneto-optical response of the $Tb_{1.63}Lu_{1.37}Al_5O_{12}$ slab waveguide.

Further measurements were undertaken to compare the magnitude of the magneto-optical response with that of bulk crystals. The direct current output of the photodetector was measured as 25 mV, and the magneto-optical response was about 2.5 µV at 5 Oe, giving a sensitivity of 0.002%/Oe. Single crystals of $Tb_3Al_5O_{12}$ have been found to have a Verdet constant of about 0.01 deg/cm/Oe at 632.8 nm. The $Tb_{1.63}Lu_{1.37}Al_5O_{12}$ composition, can be estimated to have about half the magneto-optical response of $Tb_3Al_5O_{12}$, or about 0.005 deg/cm/Oe. The arrangement of polarizers at 45 degrees to each other gives an amplitude response (modulation index) of 1.75%/deg [D. M. Gualtieri, J. Appl. Phys. 67, 4793 (1990)]. A 1 cm path in a bulk crystal with half the magneto-optical response of $Tb_3Al_5O_{12}$ would yield a response of 0.009%/oe. The response of the waveguide is seen to be about one-quarter the idealized response, so that some birefringence effects are presumed to be present.

EXAMPLE 2

Epitaxial layers of the aluminum garnet magneto-optical waveguiding composition $Tb_{1.63}Lu_{1.37}Al_5O_{12}$ were prepared on one side of a wafer substrate of $Y_3Al_5O_{12}$ (YAG) crystal. The epitaxial layer was prepared at 1073.5° C. The YAG wafer substrate was dipped to touch the surface of the melt and then axially rotated at a unidirectional rate of 200 rev/min. Epitaxially growth proceeded over the course of fifteen minutes at a growth rate of 1.16 µm/min. This resulted in the growth of an epitaxial layer of 17.4 µm thickness on one side of the YAG wafer.

Figure 6:
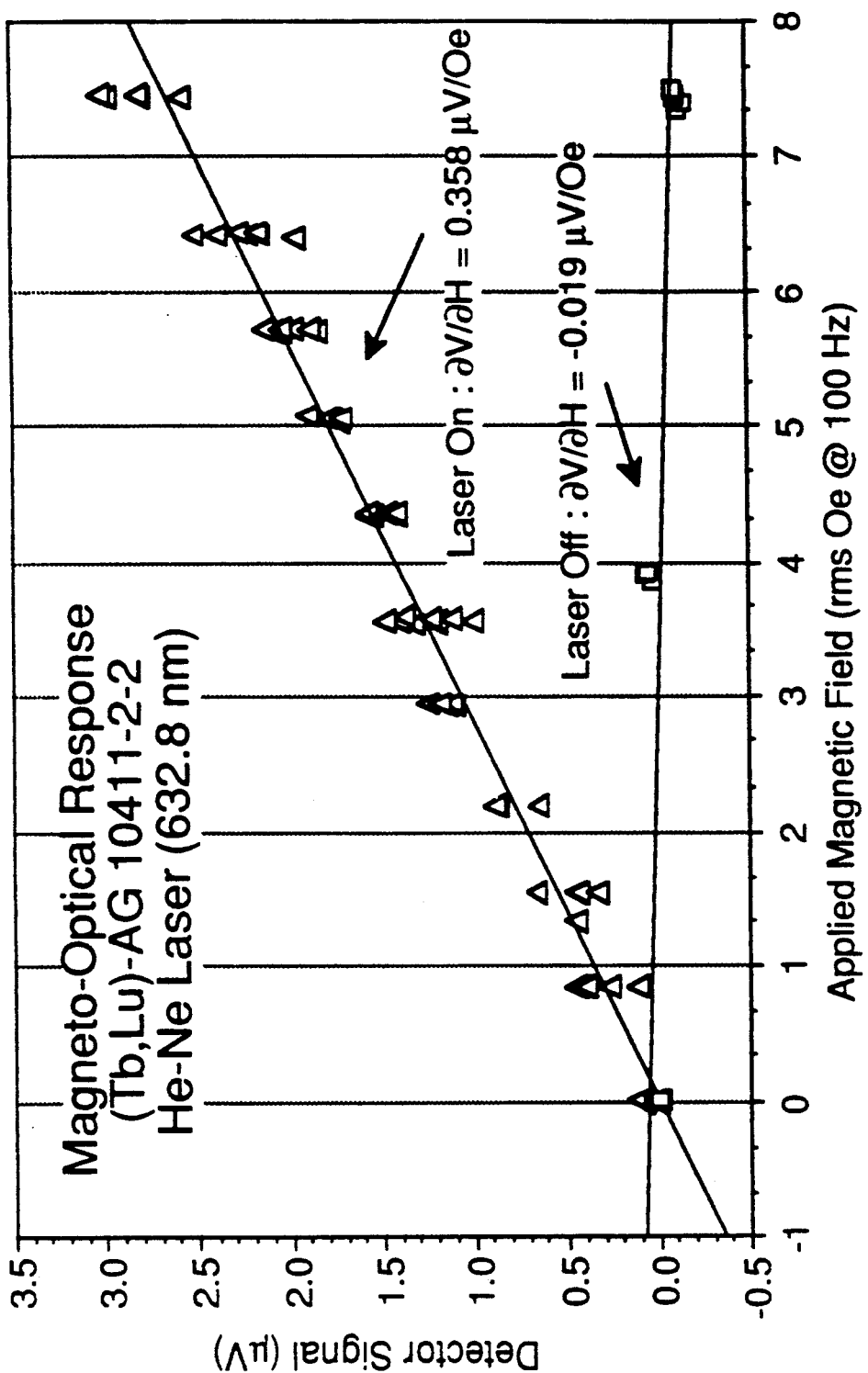
FIG. 6 is a graph showing the measured magneto-optical response of the aluminum garnet waveguide of Example 2.

The magneto-optical performance of this waveguide was tested in the manner described in Example 1. A patch at the wafer edge was polished flat to allow a better coupling of light out of the wafer. FIG. 6 shows lock-in amplifier output voltage plotted as a function of magnetic field strength for 100 Hz modulation, demonstrating the magneto-optical response of this waveguide. Also shown is a control measurement in which the laser light was prevented from entering the waveguide.

Figure 7:
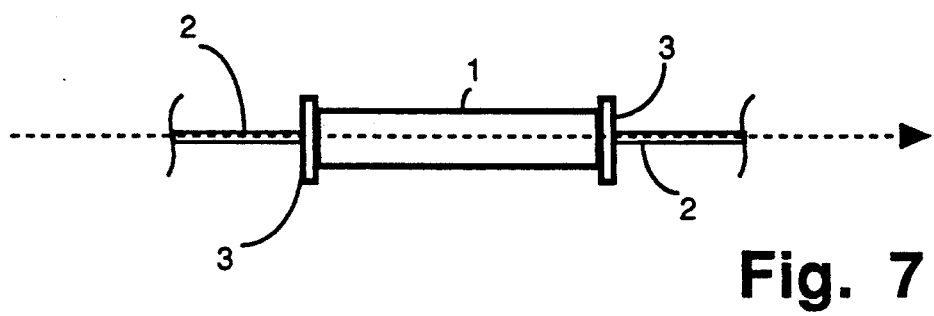
FIG. 7 schematically depicts construction of an optical isolator or sensor utilizing a magneto-optical waveguide of aluminum garnet.

The magneto-optical waveguides of the present invention are particularly suited for use in high temperature environments, as, for example, for optical engine controls for turbine engines, and the like. FIG. 7 schematically illustrates construction of an optical isolator or sensor utilizing a magneto-optical waveguide of the present invention. Optical isolators are optical components which are inserted into a light path to prevent reflected light from retracing its path in a reverse circuit. As a particular example of the utility of the non-reciprocal nature of light propagation through these elements, optical isolators are used to prevent reflected light from entering laser diode light sources and degrading their useful life and stable operation. Optical isolators of the magneto-optical type are formed from a specific arrangement of a magneto-optical material (1), a permanent magnet biasing assembly (not shown in FIG. 7), and polarizing elements (3), such as calcite crystals or other suitable polarizing filter elements. The magnet assembly and the magneto-optical material are placed in proximity to provide a biasing magnetic field to the magneto-optical material (1) which is coaxial with the light path. The light may be passed through magneto-optic material (1) by means of optical fibers (2). The strength of the magnetic field and the distance of propagation of light through the magneto-optical material are selected such that the strength of the magneto-optical interaction (the Verdet constant) will produce a 45 degree rotation of the plane of polarization of the light propagating through the material at the particular wavelength of operation. In the construction of the optical isolator, the optical path is arranged such that the light beam first enters a polarizing element (3) through which one linear polarization of the light beam is selected. This polarized beam is then sent through the magneto-optical material (1) and acquires a rotation of its linear polarization about the axis defined by the light path of 45 degrees. The beam is then sent through another polarizing element (3) rotated 45 degrees with respect to the first polarizing element to pass without significant loss the beam as rotated by the magneto-optical element. Such a device will isolate the input port from the output port since reflected light will return to the input port with a linear polarization orthogonal to the input polarizer and will not be passed. A magneto-optical isolator constructed from a single crystal of terbium aluminum garnet has been described by F. J. Sansalone [Applied Optics 10, 2329 (1971)].

Magneto-optical sensors are of a construction similar to that of the optical isolator just described, with the exception that a biasing magnetic assembly need not be used. The magnetic field which was imposed on the magneto-optical material by the magnet assembly is replaced in the magnetic field sensor by the field to be sensed. The relative angular orientation of the polarizing elements need not be 45 degrees as in the case of the optical isolator, although greatest sensitivity to small fields is attained at 45 degrees. The intensity of the magnetic field will be represented by the degree of rotation of the polarization in the magneto-optical material. This, in turn, will be represented by the intensity of light which will be transmitted through the sensor. Various external magnetic circuits can be employed to allow sensing of magnetic materials, rather than magnetic fields, and would employ biasing magnets. The construction of the sensor is such that the presence of the magnetic material will affect the magnetic field strength at the magneto-optical material. A magneto-optical sensor of this type is described by D. M. Gualtieri et al. [J. Appl. Phys. 69, 5978 (1991)]. Likewise, current carrying coils can be used to produce magnetic fields to produce optical sensors of electric current.

Figure 8:
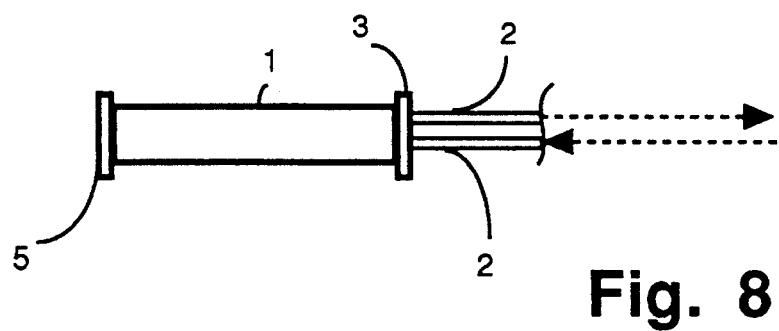
FIGS. 8 and 9 schematically depict construction of optical sensors utilizing a magneto-optical waveguide of aluminum garnet.
Figure 9:
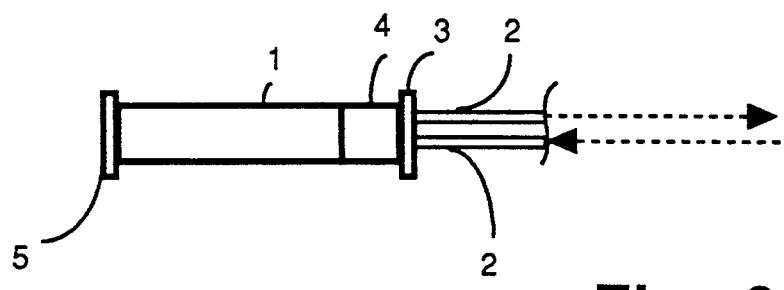

FIGS. 8 and 9 schematically illustrate waveguide sensors of the type described by Zook et al. [Appl. Optics 28, 1991 (1989)], but waveguides of the present invention. These sensors comprise waveguides (1), mirrored at one end by means of mirror (5), which guides are coupled through polarizers (3) and a gradient index rod (GRIN rod) (4) to input and output fibers (2). In operation, changes in a magnetic field acting upon guide (1) are sensed in modulation of the light output.

Since various changes may be made in the invention without departing from its spirit and essential characteristics, it is intended that all matter contained in the description shall be interpreted as illustrative only and not in a limiting sense, the scope of the invention being defined by the appended claims.

I claim:

1. A magneto-optical waveguide comprising, in combination, a magneto-optically active waveguiding body composed of a first crystalline aluminum garnet, and a cladding comprising an epitaxially deposited layer of a second crystalline aluminum garnet, wherein said second crystalline aluminum garnet has a lower refractive index than said first crystalline aluminum garnet.

2. The magneto-optical waveguide of claim 1 wherein the aluminum garnets for the higher refractive index body of the waveguide and for the epitaxial cladding layer are selected from the aluminum garnets of the composition $$R_3(Al,T)_5O_{12}$$

wherein

R represents one or more of the elements selected from the group consisting of calcium, magnesium, sodium, strontium, yttrium, lanthanum, praseodymium, neodymium, samarium, europium, gadolinium, terbium, dysprosium, holmium, erbium, thulium, ytterbium and lutetium; and T represents one or more of the 3-valent elements selected from the group consisting of gallium, indium, and scandium;

with the provisos that (1) the molar ratio of the combined concentration of indium plus scandium to aluminum does not exceed 2:3;

(2) if R includes one or more of $Na^{+1}$, $Ca^{+2}$, $Mg^{+2}$ or $Sr+2$, then T must include one or more charge-compensating ions selected from the group consisting of $Fe^{+4}$, $Ge^{+4}$, $Hf^{+4}$, $Ir^{+4}$, $Mo^{+4}$, $Nb^{+4}$, $Os^{+4}$, $Pb^{+4}$, $Pt^{+4}$, $Re^{+4}$, $Rh^{+4}$, $Ru^{+4}$, $Si^{+4}$, $Sn^{+4}$, $Ta^{+4}$, $Ti^{+4}$, $Zr^{+4}$, $V^{+4}$, $W^{+4}$, $As^{+5}$, $Mo^{+5}$, $Nb^{+5}$, $Re^{+5}$, $Sb^{+5}$, $Ta^{+5}$, $U+5$, $V^{+5}$, $Mo^{+6}$, $Re^{+6}$, $W^{+6}$, and $Re^{+7}$, in proportions sufficient to achieve an average cation charge of three in the crystal; and (3) in the waveguiding body, R must include at least one or more of praseodymium, neodymium, samarium, gadolinium, terbium, dysprosium, holmium, erbium, thulium and ytterbium.

3. The magneto-optical waveguide of claim 2 wherein the aluminum garnets for the higher refractive index body of the waveguide and for the epitaxial cladding layer are selected from aluminum garnets of the composition $$R_3(Al,T)_5O_{12}$$

wherein

R represents one or more of the elements selected from the group consisting of calcium, magnesium, yttrium, lanthanum, praseodymium, neodymium, samarium, europium, gadolinium, terbium, dysprosium, holmium, erbium, thulium, ytterbium and lutetium; and T represents one or more of the 3-valent elements selected from the group consisting of gallium, indium, and scandium;

with the provisos that (1) the molar ratio of the combined concentration of indum plus scandium to aluminum does not exceed 2:3; and that (2) if R is one or both of $Ca^{+2}$ and $Mg^{+2}$, then T includes one or both of $Ge^{+4}$ and $Si^{+4}$ in equimolar concentration relative to the $Ca^{+2}$ and/or $Mg^{+2}$ to achieve an average cation charge of three in the crystal.

4. The magneto-optical waveguide of claim 1 wherein the body of the waveguide is an aluminum garnet selected from the composition $(Tb,Lu)_3Al_5O_{12}$, $Ho_3Al_5O_{12}$, $(Dy,Er)_3Al_5O_{12}$, $(Dy,Er)_3(Sc,Al)_5O_{12}$ and $(Tb,Er)_3(Sc,Al)_5O_{12}$.

5. The magneto-optical waveguide of claim 4 wherein the epitaxial cladding layer is yttrium aluminum garnet.

6. The magneto-optical waveguide of claim 4 wherein the body of the waveguide has the composition $(Tb,Lu)_3Al_5O_{12}$ and the epitaxial cladding layer is yttrium aluminum garnet.

7. The magneto-optical waveguide of claim 4 wherein the body of the waveguide has the composition $Tb_{1.65}Lu_{1.35}Al_5O_{12}$ and the epitaxial cladding layer is yttrium aluminum garnet.

8. The magneto-optical waveguide of claim 3 comprising an yttrium aluminum garnet base, having epitaxially deposited thereon a magneto-optical aluminum garnet waveguiding body of the composition $R_3(Al,T-$ )$_5$O$_{12}$ having a higher refractive index than said yttrium aluminum garnet, and having an epitaxial cladding layer of yttrium aluminum garnet on said magneto-optical aluminum garnet waveguiding body.

9. The magneto-optical waveguide of claim 3 wherein the magneto-optical waveguiding member is an optical fiber.

10. The magneto-optical waveguide of claim 9 wherein the epitaxial cladding layer is yttrium aluminum garnet.

11. The method for forming a magneto-optical waveguide according to claim 1 which comprises providing a base of a first aluminum garnet, epitaxially depositing thereon a second aluminum garnet having a higher refractive index than said first aluminum garnet, and epitaxially depositing on said second aluminum garnet a third aluminum garnet cladding layer having a lower refractive index than said second aluminum garnet.

12. The method of claim 11 wherein said first and said third aluminum garnet are both yttrium aluminum garnet.

13. A magneto-optical device comprising a magneto-optical waveguide according to claim 1.

14. The magneto-optical device of claim 13 which is an optical isolator.

15. The magneto-optical device of claim 13 which is a sensor.

* * * * *